United States Patent [19]

Fontana

[11] 4,349,937
[45] Sep. 21, 1982

[54] CASTER ASSEMBLY WITH SWIVEL LOCK AND BRAKE

[75] Inventor: Frank J. Fontana, Stratford, Conn.

[73] Assignee: Stewart-Warner Corporation, Chicago, Ill.

[21] Appl. No.: 167,680

[22] Filed: Jul. 11, 1980

[51] Int. Cl.³ .............................................. B60B 33/60
[52] U.S. Cl. ..................................................... 16/35 R
[58] Field of Search ............................ 16/35 R, 35 D; 188/1.12

[56] References Cited

U.S. PATENT DOCUMENTS

| | | | |
|---|---|---|---|
| 1,633,638 | 6/1927 | Jarvis | 16/35 R |
| 2,262,433 | 11/1941 | Uecker et al. | 16/35 |
| 2,345,442 | 3/1944 | Winters et al. | 16/35 R |
| 2,707,749 | 5/1955 | Kramcsak, Jr. | 16/35 R |
| 3,162,888 | 12/1964 | Möbus | 16/35 R |

*Primary Examiner*—Doris L. Troutman
*Attorney, Agent, or Firm*—Augustus G. Douvas

[57] ABSTRACT

A caster assembly of the type that accommodates swivelling movement of the caster wheel including a U-shaped horn that flanks the sides of a soft tread and supports a wheel axle. A swivel plate is mounted at the top of the horn, adapted to be connected to the underside of the article to be supported, and it carries a pin that extends through the horn and has an annular toothed swivel lock plate at its lower end. A unitary swivel lock and brake member is reciprocably mounted on spaced rearwardly projecting horn ears and has serrations at its top defining teeth that engage the swivel lock plate teeth to lock the horn with respect to the swivel plate. The lower end of the swivel lock and brake member has an arcuate brake shoe that bites into the soft tread of the outer surface of the wheel to effect braking. A pivotally mounted foot-operated actuator is carried by the horn adjacent the swivel lock and brake member and it has cam surfaces that engage and shift the swivel lock and brake member laterally to substantially simultaneously effect both swivel lock and braking functions.

13 Claims, 7 Drawing Figures

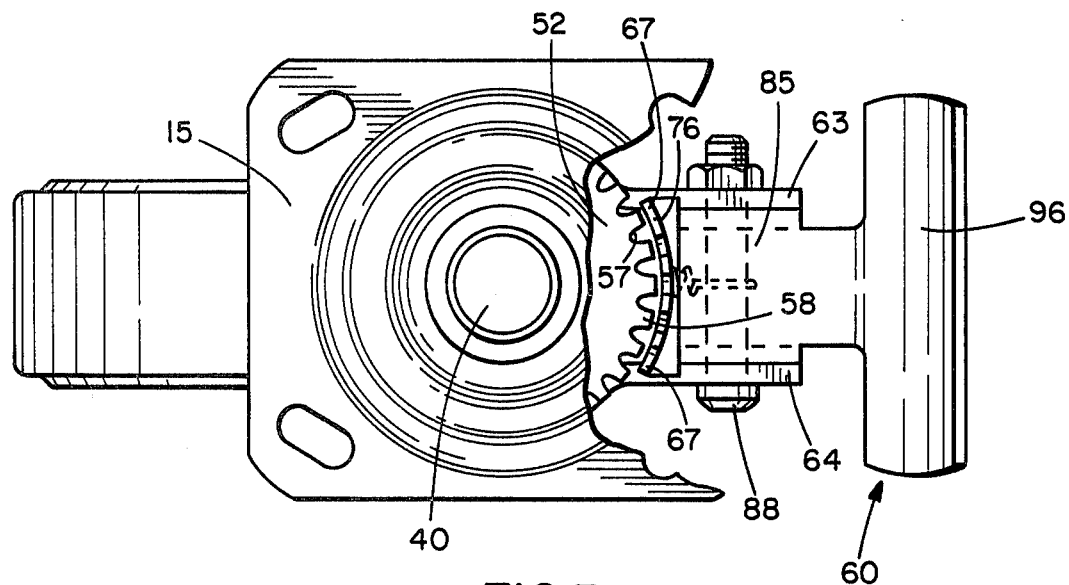
FIG.3
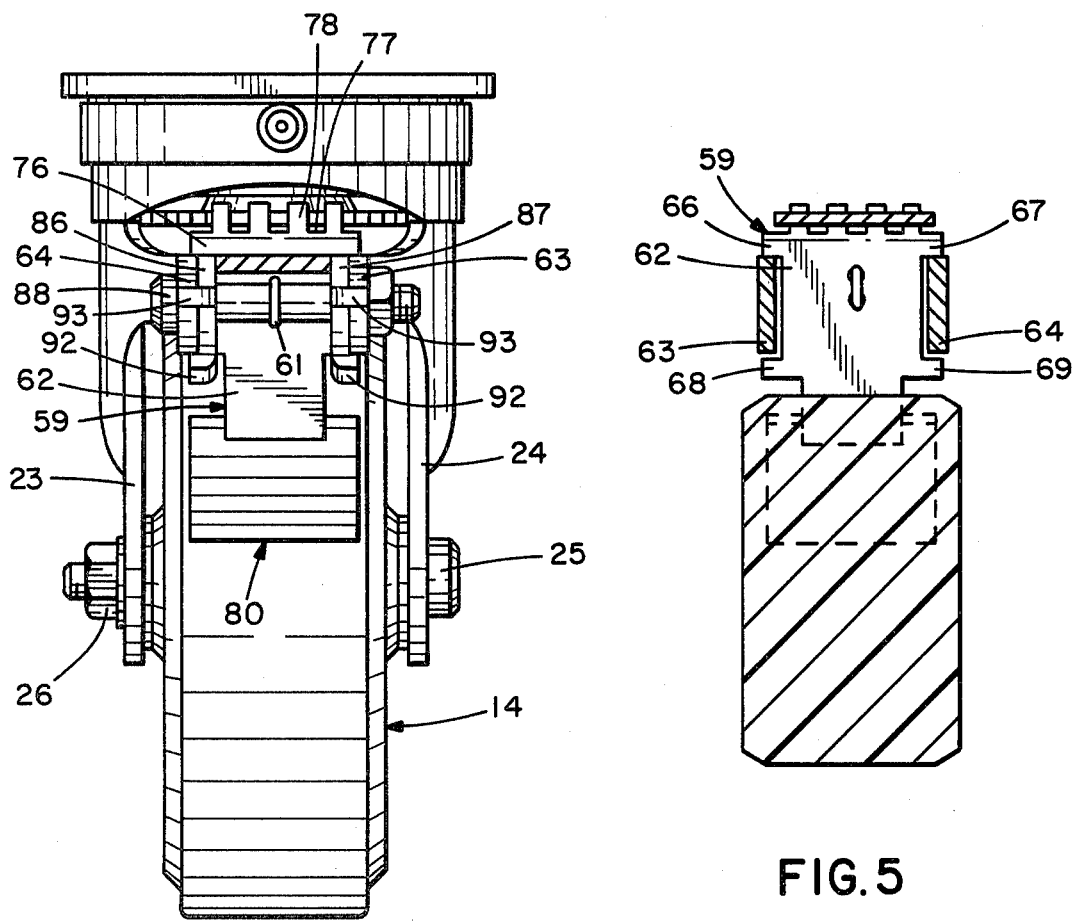
FIG.4
FIG.5

CASTER ASSEMBLY WITH SWIVEL LOCK AND BRAKE

BACKGROUND OF THE INVENTION

Brake assemblies for casters have been provided in a variety of configurations for many years. The general purpose of these brakes is to prevent rotation of the caster wheel and thereby immobilize the article or equipment supported by one or more of the caster assemblies. In one prior brake assembly, a separate cam plate is pivotally mounted on the axle of the wheel and upon pivoting by a foot operated lever, its cam surface engages the side of the wheel shifting it axially and in effect binding the wheel against the opposite side of the horn to effect wheel braking.

In another prior brake assembly, a brake member is cammed into engagement with the outer surface of the wheel by a pivotal camming arrangement to effect braking. A variety of other braking arrangements, too numerous to mention here, have been provided in the past, but none are believed any more similar to the present invention than the ones just described.

Similarly, swivel lock assemblies have been provided for casters that accommodate swivelling movement of the wheel about a pivotal axis. In one conventional form of caster assembly, a swivel plate is provided mounted on top of the horn for pivotal movement with respect thereto, and this swivel plate is adapted to be fixed to the article to be supported. The swivelling movement of the caster is desirable to achieve increased maneuverability of the supported article. It is desirable to selectively prevent swivelling of the caster wheel to assist in completely immobilizing the article supported, particularly, although not necessarily, in conjunction with a braking assembly. Various locking assemblies have been provided for this purpose, but they have been found to be not only expensive to manufacture, but also to my knowledge, they have achieved swivel locking only in a semipositive fashion which is not desirable in applications that require a high degree of reliability in immobilizing the supported article.

It is a primary object of the present invention to ameliorate the problems noted above in swivel caster assemblies having swivel lock mechanisms and/or wheel braking mechanisms.

SUMMARY OF THE PRESENT INVENTION

In accordance with the present invention, a swivel caster is provided with a simplified swivel lock and brake assembly for simultaneously positively locking the caster from swivelling motion and positively locking the caster wheel from rotation. Toward this end, the present caster includes a generally U-shaped horn member carrying an axle that rotatably supports a wheel with a somewhat resilient plastic outer tread surface. A swivel plate is provided rotatably mounted in bearings on top of the horn, that is adapted to be connected to the article to be supported and effect the desired swivelling movement of the caster wheel.

The swivel plate is rotatably mounted on the horn by a central "kingpin" that is welded to the plate and extends vertically through a central opening therein. This pin carries at its lower end beneath the horn, i.e., between the "bite" portion of the horn and the wheel, an annular swivel lock plate that has serrations about its outer surface defining an annular array of teeth, and thus the swivel plate and the swivel lock plate are mounted together for rotation on the horn.

A unitary swivel lock and brake member is mounted for lateral movement on rearwardly projecting ears on the horn. The upper end of this swivel lock and brake member is bent somewhat toward the swivel lock plate and is serrated in the same fashion as the swivel lock plate to define a plurality of upwardly extending teeth that selectively engage the swivel lock teeth to prevent rotation of the swivel lock plate and hence the swivel plate with respect to the horn. The lower end of this swivel lock and brake plate has an arcuate integral segment that is selectively engageable with the outer tread surface of the wheel to prevent rotation of the wheel. This arcuate segment has a radius less than the radius of the outer surface of the soft tread of the wheel and hence the ends of the segment dig into the resilient tread surface to effectively positively lock the wheel from rotating in either direction.

A foot-operated actuator member is pivotally mounted in the same rearwardly projecting horn ears for substantially simultaneously actuating both the upper end of the swivel lock and brake member with the swivel lock plate and the lower arcuate segment thereof into engagement with the soft tread surface of the wheel for braking. Toward this end, the actuator has a U-shaped portion defining spaced identical cams that engage the rear surface of the swivel lock and brake member and shift it toward the swivel lock plate and the wheel.

The cam portions of the actuator have projections that engage the horn to limit movement of the actuator at both of its extreme positions. A tension spring is provided between an actuator pivot shaft and the swivel lock and brake member to assist in disengaging the swivel lock and brake member from both the swivel lock plate and the wheel tread.

The engagement of the teeth of the swivel lock and brake member upper teeth with the swivel lock plate positively locks the swivel plate from movement with respect to the horn in a far superior manner than known in any prior constructions. Similarly, the braking function is achieved in a positive manner by the ends of the arcuate brake segment of the swivel lock and brake member biting into the resilient tread surface of the wheel.

An important advantage of the present caster construction is that the swivel lock and brake functions are achieved with a single swivel lock and brake member in a far simpler fashion than can be achieved by separate swivel lock and brake assemblies heretofore known in the art. dr

BRIEF DESCRIPTION OF THE DRAWINGS

FIG. 3 is a top view of the swivel caster illustrated in FIG. 2 with the swivel plate partly broken away to illustrate swivel lock plate teeth and teeth on the upper end of a swivel lock and brake member;

FIG. 4 is a rear view of the swivel caster illustrated in FIG. 2;

FIG. 5 is a cross-section taken generally along line 5—5 of FIG. 2;

DETAILED DESCRIPTION OF THE PREFERRED EMBODIMENT

Figure 1:
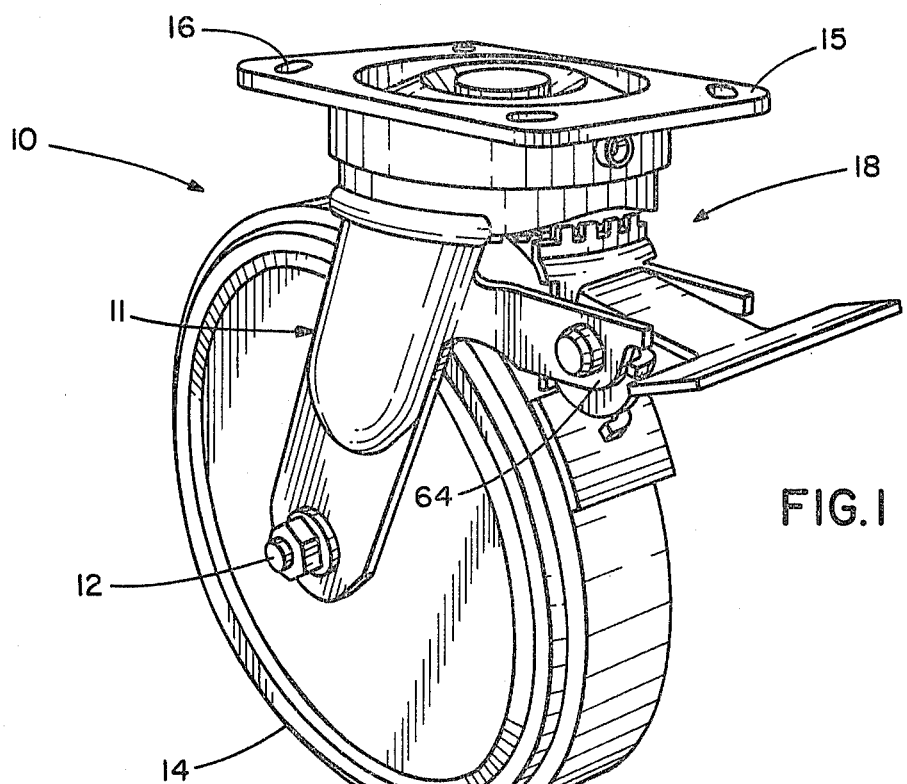
FIG. 1 is a perspective view of the present swivel caster with a swivel lock and brake assembly.
Figure 2:
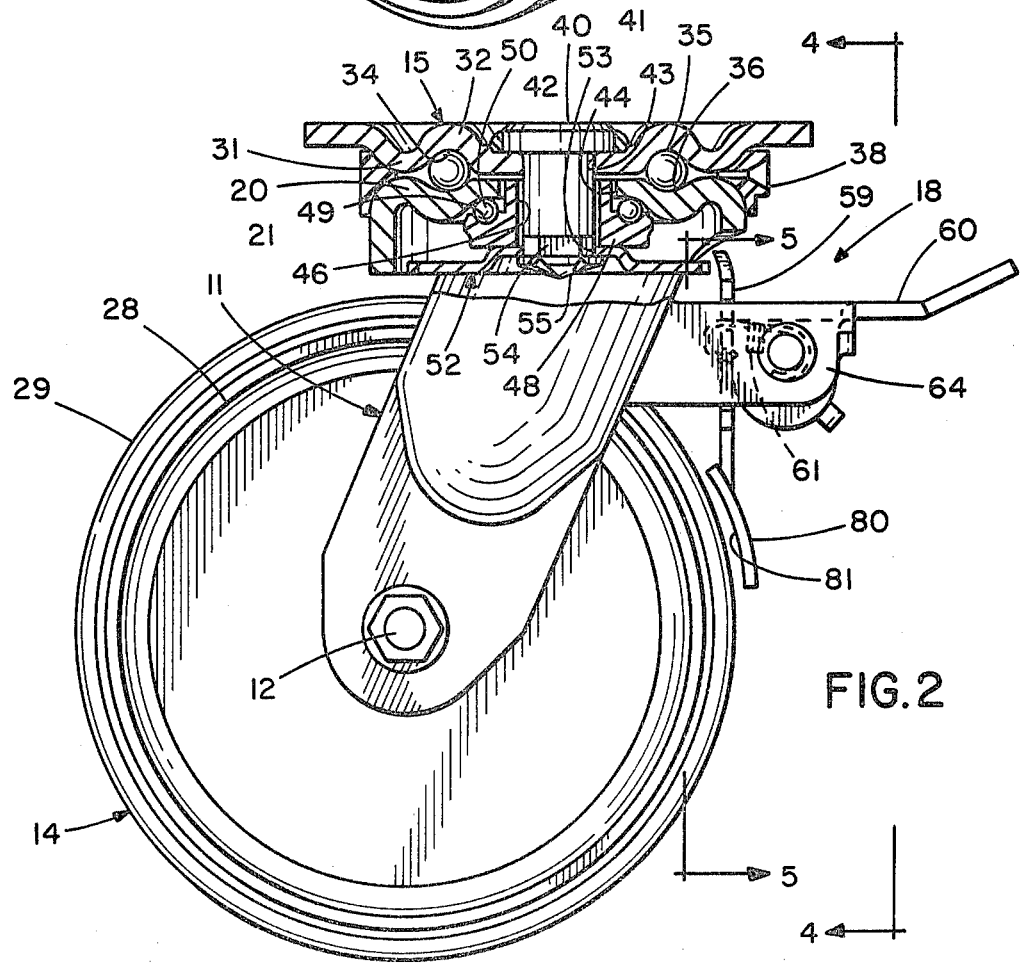
FIG. 2 is a side view of the swivel caster illustrated in FIG. 1 with the upper portion of its horn assembly and swivel plate illustrated in cross-section.

Referring to the drawings, and particularly FIGS. 1 and 2, the present swivel caster 10 is illustrated consisting generally of a U-shaped horn 11 carrying an axle 12 that supports a wheel 14 for rotation, with the horn carrying a freely rotatable rectangular swivel plate 15 on its upper surface. Swivel plate 15 has a plurality of apertures 16 therethrough that are adapted to receive fasteners to connect the swivel plate 15 to the article to be supported. With the swivel plate 15 fixed to the supported article, the horn 11 and wheel 14 are free to pivot about a vertical axis with respect to the swivel plate to increase the maneuverability of the article supported by a plurality of the caster assemblies 10.

A swivel lock and brake assembly 18 is provided for substantially simultaneously locking the horn 11 from movement with respect to the swivel plate 15 and preventing rotation of the wheel 14 in either direction.

As seen in FIGS. 2, 3 and 4, the horn 11, preferably constructed of a ferrous metal, has a top surface 20 with an annular depending flange 21 connected to spaced parallel side legs 23 and 24. The lower ends of the legs 23 and 24 have apertures that receive an axle 25 fastened in position by a threaded nut.

Wheel 14 is rotatably mounted on the axle 25 and includes a metal hub 28 with an outer tread 29 of a somewhat resilient plastic material, such as nylon, molded directly on the periphery thereof.

The swivel plate 15 is a rectangular member constructed of a ferrous metal, but it should be understood that it may as well be circular in outer configuration. The swivel plate 15 has stamped opposed semi-toroidal ridges 31 and 32 that together define a toroidal recess 34 that forms one race for a plurality of ball bearings 35, also seated in a stamped semi-toroidal mating recess 36, disposed centrally in the top 20 of the horn 11.

The space between the swivel plate 15 and the top 20 of the horn is sealed and lubricated by a plastic seal and lube ring 38 described in detail in my copending application entitled "Swivel Type Caster with Seal and Lubrication Ring", Ser. No. 161,861 filed June 23, 1980 and assigned to the assignee of the present invention.

The swivel plate 15 is axially fixed to the horn 11 by a "kingpin" 40 that is welded at its upper end to the upper surface of the swivel plate 15 by weldments 41. Pin 40 has a shank portion 42 that extends through a central aperture 43 in swivel plate 15, freely through a central opening 44 in the horn top 20, and through a central opening 46 in annular thrust member 48. Thrust member 48 has a semi-toroidal recess 49 in the upper surface thereof that receives ball bearings 50 that engage the lower surface of the horn top 20 to axially lock, with bearings 35, the swivel plate 15 to the horn top 20 in both directions while permitting free rotational movement therebetween.

The lower end of the kingpin 40 carries an annular swivel lock plate 52 that forms part of the swivel lock and brake assembly 18. The plate 52 has a hexagonal central opening 53 that is snugly seated on a complementary lower end 54 of the pin 40, preventing rotation of the lock plate 52 with respect to the swivel plate 15. The lower end of the pin 40 is swaged as shown at 55 to stake the lock plate 52, the thrust member 48 and the swivel plate 15 as a unit on the top 20 of the caster horn 11.

As seen clearly in FIGS. 3 and 4, the lock plate 52 has a plurality of scalloped recesses 57 therein, preferably formed in a single stamping operation, defining an annular array of teeth 58. As seen in FIGS. 1 and 2, the swivel lock and brake assembly 18 includes a generally vertical swivel lock and brake member 59 reciprocably mounted on horn 11, a cam actuator 60 for shifting the swivel lock and brake member 59 against lock plate 52 and wheel 14, and a return spring 61 for assisting in disengaging or releasing the swivel lock and brake member 59.

The swivel lock and brake member 59 is a unitary one-piece member preferably made of a metal such as steel, and is seen to include a flat rectangular central portion 62 that slides between rearwardly extending integral ears or projections 63 and 64 on horn legs 24 and 23, respectively. Central portion 62 has laterally extending upper projections 66 and 67 (see FIGS. 3 and 5) that ride on top of the horn ears 63 and 64, and laterally extending lower projections 68 and 69 that loosely engage the lower surfaces of the horn ears 63 and 64 to retain the swivel lock and brake member 59 in position and assist in guiding it for lateral movement along horn ears 63 and 64.

As seen clearly in FIGS. 3, 4, 6 and 7, the upper end 76 of the swivel lock and brake member 59 is arcuate in configuration and has a radius substantially equal to the outermost radius of the swivel lock plate 52 as seen most clearly in FIG. 3. End 76 has a plurality of stamped notches 77 that define teeth 78 sized so that they fit within the recesses 57 in the periphery of the swivel lock plate 52 to positively lock the plate 52 from rotation.

Figure 6:
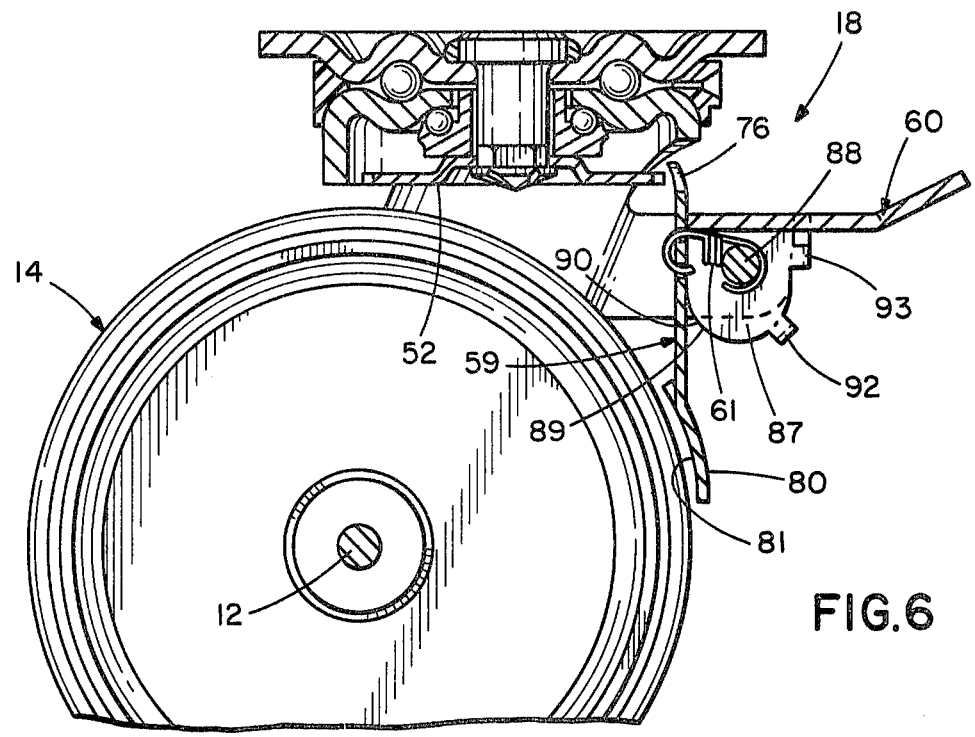
FIG. 6 is a partly fragmentary cross-section generally similar to FIG. 2 with the swivel lock and brake assembly illustrated in a disengaged position.
Figure 7:
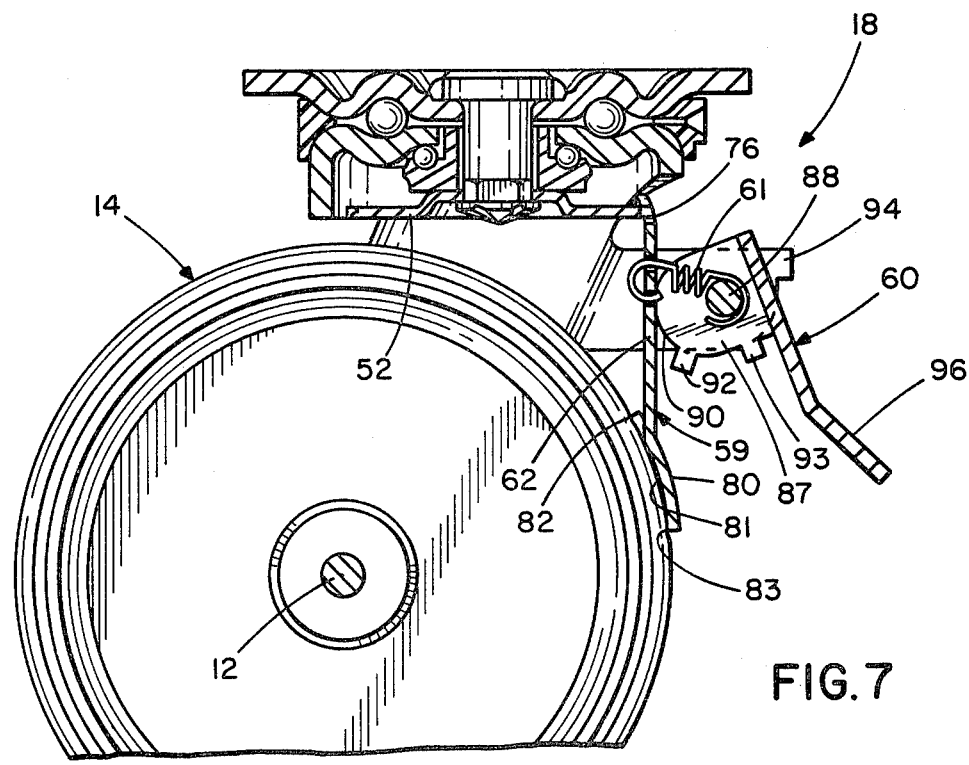
FIG. 7 is a cross-section generally similar to FIG. 6 with the swivel lock and brake member illustrated in an engaged position.

The lower end of swivel lock and brake member 59 is enlarged laterally (see FIG. 4) and defines a generally rectangular (in the plane of FIG. 4) but arcuate brake shoe segment 80. As seen in FIGS. 6 and 7, the brake shoe segment 80 is formed from the same piece as the central section 62 and is bent from the plane of this central section. The radius of inner surface 81 of the brake shoe segment 80 is significantly less than the radius of the outer surface of the resilient tread 29 so that upon application of the brake segment 80 to the wheel 14, ends 82 and 83 of the brake segment 80 will dig into the resilient periphery of tread 29 and the resulting "biting" action positively prevents rotation of wheel 14 in either direction.

As seen in FIG. 3, the actuator 60 has a flat rectangular central portion 85 with downwardly turned flanges 86 and 87 at the side thereof that fit between and engage the inside surfaces of the horn ears 64 and 63, respectively. The actuator 60 is pivotally mounted on the horn ears 63 and 64 by a threaded member 88 that extends through the ears 63 and 64 and through bores in the projections 86 and 87 to pivotally mount the actuator 60 for movement about a horizontal axis.

The actuator projections 86 and 87 have identical eccentric outer cam surfaces 89 that engage rear surface 90 of the swivel lock and brake member 59, and these cams are shaped such that as the actuator is rotated from the released position shown in FIG. 6 to the actuated position shown in FIG. 7, the cams will shift the swivel lock and brake member 59 sufficiently laterally to the left to tightly engage teeth 78 with the swivel lock plate 52 and also engage and bite the ends 82 and 83 of the brake shoe segment 80 into the outer periphery of the wheel tread 29.

The downward projections 86 and 87 on the actuator 60 have angularly spaced outwardly extending integral lug pairs 92 and 93 that limit the extreme rotational positions of actuator 60. Lug pair 93 engages projections 94 integrally formed with horn ears 63 and 64 to limit the counterclockwise movement of actuator 60, and lug pair 92 engages the lower surfaces of the ears 63 and 64 to limit the extreme clockwise movement of the actuator 60 in the engaged position shown in FIG. 7. By appropriately positioning lugs 92, the swivel lock and braking forces exerted by member 59 may be controlled as desired during manufacture. The actuator 60 has an enlarged upwardly bent end portion 96 that defines a foot pedal for actuation and release of the swivel lock and brake mechanism 18.

As seen in FIGS. 6 and 7, the coiled tension spring 61 has a hook portion at one end around actuator pivot 88 and a hook portion at the other end that extends through a small hole in the swivel lock and brake member 59. Spring 61 assists in disengaging the swivel lock and brake member 59 when the actuator 60 is moved from the position shown in FIG. 7 to the FIG. 6 position thereof.

What is claimed is:

1. A caster assembly, comprising; horn means, an axle carried by said horn means, a wheel supported for rotation on said axle, a swivel plate mounted on said horn means for pivotal movement about an axis generally transverse to the axis of the wheel, a locking plate fixed to the swivel plate for movement therewith, a brake and swivel lock assembly carried by the horn means for substantially simultaneously engaging the swivel lock plate and the wheel to prevent swivelling and rotational movement of the wheel, the brake and swivel lock assembly including a brake and swivel lock member reciprocably mounted in the horn means, an operator member pivotally mounted in the horn means and engaging the brake and swivel lock member to shift the brake and swivel lock member into engagement with a swivel plate and the wheel, the brake and swivel lock member having an arcuate segment selectively engageable with the wheel, the wheel having a resilient tread surface, and said arcuate segment of the swivel lock member being rigid having a radius less than the radius of the tread surface on the wheel so that the ends of the arcuate segment bite into the tread surface to prevent rotation of the wheel in either direction.

2. A caster assembly, comprising; a horn member, an axle mounted in the horn member, a wheel mounted on the axle for rotation, a swivel plate mounted on the horn member for pivotal movement about a generally vertical axis generally transverse to the axis of the axle, said swivel plate having an annular array of horizontal outwardly extending projections, a generally vertically extending swivel lock member mounted in the horn member for generally horizontal movement, said swivel lock member being generally flat and having a plurality of projections extending upwardly therefrom generally in the same plane as the swivel lock member selectively engageable with the projections on the swivel plate, and an actuator on the horn member for engaging the swivel lock member with the swivel plate to prevent rotation of the horn member with respect to the swivel plate.

3. A caster assembly as defined in claim 2, wherein the swivel plate is rotatably mounted on the upper portion of the horn member, said horn member having a portion thereof extending across the outside of the wheel, said swivel plate being generally flat and annular in configuration and having integral radial projections extending therefrom.

4. A caster assembly as defined in claim 3, wherein said actuator is pivotally mounted in the horn member and has a cam surface engaging said swivel lock member.

5. A caster assembly, comprising; a generally U-shaped horn member, an axle mounted in the horn member, a wheel supported for rotation on the axle, a swivel plate rotatably mounted on the upper side of the horn member, a pin connected centrally to the swivel plate and extending through the horn member, an annular swivel lock plate connected to the pin on the underside of the horn member, said swivel lock plate having an annular array of teeth projecting radially outwardly therefrom, a substantially straight swivel lock member mounted in the horn member for movement transverse to the axis of the pin, said swivel lock member having an arcuate segment of teeth projecting upwardly in substantially the same plane as the swivel lock member for selective engagement with the teeth on the swivel plate, said horn member having a pair of rearwardly extending ear portions, said swivel lock member having recesses on the sides thereof that slidably receive the rearwardly extending horn ear portions, and an actuator pivotally mounted in the horn member ear portions, said actuator having spaced cam surfaces engaging the rear surface of the swivel lock member to engage the swivel lock member with the swivel lock plate to prevent rotation of the horn member with respect to the swivel plate.

6. A caster assembly, comprising; a horn member, an axle mounted in the horn member, a wheel mounted on the axle for rotational movement, said wheel having a resilient tread surface, a brake member mounted for movement in the horn member, said brake member having an arcuate tread surface engaging portion, said arcuate tread surface engaging portion having a radius directed generally toward the axis of rotation of the wheel, said radius being less than the radius of the wheel tread surface so that the ends of the arcuate portion bite into the resilient tread surface to prevent rotation of the wheel in either direction of rotation, and an actuator for engaging the brake urging the brake member arcuate portion toward and into engagement with the resilient tread surface to prevent the wheel from rotating with respect to the horn member.

7. A caster assembly as defined in claim 6, wherein the brake member is reciprocably mounted in the horn member.

8. A caster assembly as defined in claim 7, wherein the brake member has side recesses slidably receiving the horn member.

9. A caster assembly as defined in claim 6, wherein the actuator is pivotally mounted in the horn member and has spaced cam surfaces engageable with the brake member.

10. A caster assembly with swivel lock and wheel braking, comprising; a generally U-shaped horn member, an axle mounted in said horn member, a wheel mounted on said axle for rotation, a swivel plate mounted for rotation on top of the horn member, a pin fixed to the swivel plate extending vertically through the horn member, a swivel lock plate mounted under the horn member and fixed to the pin to pivot with the swivel plate, said swivel lock plate being generally flat and having generally radially extending teeth projecting outwardly therefrom, a swivel lock and brake member mounted for generally horizontal movement in the horn member, said swivel lock and brake member having a plurality of generally coplanar teeth extending upwardly therefrom engageable with the swivel lock plate teeth to prevent rotation thereof with respect to the horn member, said swivel lock and brake member having a rigid arcuate portion at the other end thereof having ends both engageable with the wheel to brake the wheel, and an actuator pivotally mounted in the horn member and having a cam surface engageable with the swivel lock and brake member to shift the swivel lock and brake member into engagement with the swivel lock plate and the wheel to positively prevent swivelling or rotational motion of the wheel.

11. A caster assembly as defined in claim 10, wherein the swivel lock plate has an annular array of peripheral recesses defining the outwardly extending teeth, said swivel lock and brake member teeth being defined by a plurality of recesses at the upper end thereof selectively engageable with the teeth on the swivel lock plate.

12. A caster assembly as defined in claim 10, wherein the wheel has a resilient outer tread, said arcuate portion of the swivel lock and brake member having a radius directed toward the axis of rotation of the wheel, said radius being less than the radius of the outer surface of the resilient wheel treated so that the ends of the arcuate portion dig into the tread surface during braking.

13. A caster assembly with swivel lock and wheel braking, comprising; a generally U-shaped horn member, an axle mounted in said horn member, a wheel having a resilient outer tread surface mounted on said axle for rotation, a swivel plate mounted for rotation on top of the horn member, a pin fixed to the swivel plate and extending vertically through the horn member, a swivel lock plate mounted under the horn member fixed to the pin to pivot with the swivel plate, said swivel lock plate having an annular array of peripheral recesses defining radially outwardly extending teeth, a generally flat swivel lock and brake member mounted for reciprocating movement in the horn member, said swivel lock and brake member having a plurality of recesses at the upper end thereof defining upwardly extending teeth selectively engageable with the teeth on the swivel lock plate, said swivel lock and brake member having an arcuate portion on the other end thereof for engaging the resilient outer tread surface of the wheel, said arcuate portion of the swivel lock and brake member having a radius directed toward the axis of rotation of the wheel, said radius being less than the radius of the outer surface of the resilient wheel tread so that the ends of the arcuate portion bite into the tread surface during braking, and an actuator pivotally mounted in the horn member and having spaced cam surfaces engageable with the swivel lock and brake member to shift the swivel lock and brake member laterally into engagement substantially simultaneously with the swivel lock plate and the wheel to prevent swivelling or rotation of the wheel.

* * * * *